US006364769B1

(12) United States Patent
Weiss et al.

(10) Patent No.: US 6,364,769 B1
(45) Date of Patent: *Apr. 2, 2002

(54) GAMING DEVICE SECURITY SYSTEM: APPARATUS AND METHOD

(75) Inventors: Steven A. Weiss; Rex R. Carlson, both of Las Vegas, NV (US)

(73) Assignee: Casino Data Systems, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/577,016

(22) Filed: May 22, 2000

Related U.S. Application Data

(63) Continuation of application No. 08/861,092, filed on May 21, 1997, now Pat. No. 6,071,190.

(51) Int. Cl.[7] .................................................. A63F 13/00

(52) U.S. Cl. ............................. 463/29; 463/25; 463/16; 463/42

(58) Field of Search .............................. 463/16, 20, 25, 463/29, 40–43

(56) References Cited

U.S. PATENT DOCUMENTS

| | | | | |
|---|---|---|---|---|
| 4,200,770 | A | | 4/1980 | Hellman et al. |
| 4,405,829 | A | | 9/1983 | Rivest et al. |
| 4,467,424 | A | | 8/1984 | Hedges et al. |
| 4,636,951 | A | | 1/1987 | Harlick |
| 4,764,666 | A | | 8/1988 | Bergeron |
| 4,882,473 | A | | 11/1989 | Bergeron et al. |
| 5,119,295 | A | | 6/1992 | Kapur |
| 5,398,932 | A | | 3/1995 | Eberhardt et al. |
| 5,429,361 | A | | 7/1995 | Raven et al. |
| 5,470,079 | A | | 11/1995 | LeStrange et al. |
| 5,476,259 | A | | 12/1995 | Weingardt |
| 5,489,095 | A | | 2/1996 | Goudard et al. |
| 5,517,502 | A | * | 5/1996 | Bestler et al. ............. 370/94.2 |
| 5,542,669 | A | * | 8/1996 | Charron et al. ............... 463/13 |
| 5,583,562 | A | * | 12/1996 | Birch et al. ................... 348/12 |
| 5,586,937 | A | * | 12/1996 | Menashe ..................... 463/41 |
| 5,611,730 | A | | 3/1997 | Weiss |
| 5,643,086 | A | | 7/1997 | Alcorn et al. |
| 5,655,961 | A | | 8/1997 | Acres et al. |
| 5,668,950 | A | | 9/1997 | Kikuchi et al. |
| 5,768,382 | A | | 6/1998 | Schneier et al. |
| 5,770,533 | A | | 6/1998 | Franchi |
| 5,894,556 | A | * | 4/1999 | Grimm et al. ................ 463/42 |
| 5,903,652 | A | * | 5/1999 | Mital .......................... 380/25 |
| 6,042,477 | A | * | 3/2000 | Addink ........................ 463/42 |
| 6,099,408 | A | * | 8/2000 | Schneier et al. .............. 463/29 |

* cited by examiner

*Primary Examiner*—Valencia Martin-Wallace
*Assistant Examiner*—John M Hotaling, II
(74) *Attorney, Agent, or Firm*—Bernhard Kreten

(57) ABSTRACT

A gaming device security system is disclosed which includes two processing areas linked together and communicating critical gaming functions via a security protocol wherein each transmitted gaming function includes a specific encrypted signature to be decoded and validated before being processed by either processing area. The two processing areas include a first processing area having a dynamic RAM and an open architecture design which is expandable without interfering or accessing critical gaming functions and a second "secure" processing area having a non-alterable memory for the storage of critical gaming functions therein.

28 Claims, 8 Drawing Sheets

GAMING DEVICE SECURITY SYSTEM: APPARATUS AND METHOD

This application is a continuation of Ser. No. 08/861,092 filed May 21, 1997 now U.S. Pat. No. 6,071,190.

FIELD OF THE INVENTION

The present invention relates generally to gaming devices, and in particular, to an advanced video and slot gaming device security system having dual processing areas with a master/slave relationship wherein the master includes a secure processing area including critical gaming functions stored and executed from a non-alterable media by the secure processing area while allowing the slave processing area to have an open architecture which is expandable without compromising critical gaming functions and retaining the ability for regulatory validation of the secure processing area of the system.

BACKGROUND OF THE INVENTION

Traditional gaming devices are based around a simple processor unit including a random number generator, an accounting means operatively coupled to a static/battery backed random access memory, and an EPROM having stored therein the important gaming functions. In addition, these gaming devices include gaming displays, coin acceptors, bill validators and hoppers operatively coupled to the simple processor. These gaming devices are relatively simple and limited in scope, usually consisting of a single executing program utilizing straight forward interrupt schemes and detection loops for asynchronous events for simple evaluation. It is also a simple matter of operatively coupling an external program validation device to the EPROM for providing effective regulatory validation of critical gaming functions to preclude unauthorized tampering or modification of the gaming machine through software. In addition, an external device validation process for suspicious jackpots or disputes may be validated by simply reading the static/battery backed random access memory associated with the simple processor. Furthermore, software developers in the gaming industry are hesitant to include compromising code in traditional gaming devices due to the ease of both internal and regulatory review.

Currently, most casinos protect their large jackpots by sealing the EPROM devices containing critical code for game functions with serialized tape, and validating the code contents against a standard after a large win.

Today's trend in gaming devices is towards an increasing utilization of personal computer based gaming platforms. Personal computer based platforms are being employed by designers to make use of real time operating systems which allow for multi-threaded/multi-tasking processes and the use of many "off the shelf" device drivers. While at first, this may seem an advantage, it is not a wise choice in an environment requiring high security and regulatory monitoring. Designs of this nature elude validation by regulatory authorities in two areas, initial laboratory evaluation and field validation. Any in depth review of a PC based gaming device is both difficult and far from definitive, requiring tremendous engineering resources and specialist in computer security which are expensive and normally available only on a consultant basis. Even if these resources were available, it is impossible to study the hundreds of thousands of lines of source code comprising all of the elements of such a system. In addition, the time involved in just learning how to build the executable code from the source for correlation is time and resource prohibited. The multi-threaded/multi-tasking process nature of the programs in these devices make it extremely difficult to locate any compromising code which becomes clandestine since the actual sequence of the execution is hidden to the evaluating engineer. Furthermore, the code set for a complex PC device may not be fully embraced by the evaluating engineer.

The significant reduction of risk for detection in compromising the more complex code is an invitation to inside compromise by device designers. Further, PC based devices are simply not field verifiable, rendering any gaming jurisdiction's device inspection program or any other field validation effort useless for this gaming equipment. For example, the device must be essentially disassembled so that all BIOS EPROMs and any other software located in peripheral devices may be inspected. If CD ROMs or disk drives are used, these must also be read and verified, requiring a significant amount of time. A thorough inspection program will, of necessity, be extended in scope to include hardware since the device must be searched for approved peripherals that may modify the source code execution and function of the game. Hardware inspections are not easily defined, requiring a high level of technical skill for field personnel. Even if this capability is provided, each inspection will be time intensive thereby significantly reducing the effectiveness of any inspection program.

Even with these efforts, validation will not be absolute. Regardless of the extent of the inspection, it is impossible to guarantee that an approved program is actually executing from dynamic RAM. Large jackpot validations by the casino are also out of the question for the same reason. This is a result of the fact that programs executing in dynamic RAM are self modifiable and extremely difficult to extract from an operating device. The dynamic RAM only exists in an active operating context; therefore it is impossible to be sure of an accurate program validation during an evaluation to resolve questionable operation or a patron dispute.

At a time when regulatory goals should be to enhance slot machine security to protect the integrity of gaming, the introduction of these types of devices is an antithesis. These devices are an invitation to highly technical and non-detectable compromise by experts. At first, it may seem restrictive to prevent this type of design by regulation. However, multi media capabilities which can be offered via today's high technology can provide a very marketable scheme to patrons, therefore, alternative designs must be considered to provide these features in a responsible manner.

Therefore, a need exists for an independent secured processor design for validation which would provide all key functions such as the determination of game outcome, monetary input, output, and logging of relevant events. Furthermore, a need exists for an open architecture design, for example, a personal computer based design of the gaming device which would provide all shell functions of presenting the game environment and thus providing a substantial entertainment component of the gaming device. Therefore, even though compromise is still possible at the shell level, evidence of what should have occurred is recoverable from the specially designed secured processor.

SUMMARY OF THE INVENTION

The present invention is distinguished over the known prior art in a multiplicity of ways. For one thing, the present invention provides a video and slot gaming device security system including two processing areas linked together via a secure protocol. In addition, the present invention includes a non-alterable storage media having gaming critical functions, at a minimum, stored therein and executed from the non-alterable media by one of the two processing areas. The other processing area of the present invention includes an open architecture design which is expandable without compromising the critical gaming functions. Thus, the present invention encourages innovations of gaming devices without reducing the effectiveness of regulatory evaluation and validation processes of the critical gaming functions. Furthermore, the present invention allows for correlating true game results and monetary transactions to player presentation under suspicious circumstances, even if the open architecture processing area is tampered with.

In one preferred form, the present invention includes at least one video and/or slot gaming device. The gaming device is based around the secure processing area which includes a random number generator, an accounting and log means operatively coupled to a static or non-volatile random access memory and an EPROM having stored therein the critical gaming functions. Preferably, a coin acceptor, a bill validator and a hopper are operatively coupled to the secured processing area. In addition, the present invention includes the open architecture processing area linked to the secure processing area and communicating therewith via the secure protocol. Furthermore, a display means is operatively coupled to a visual display for displaying, inter alia, random outcomes.

The open architecture design includes an internal alterable program storage media operatively coupled to a dynamic ram. Thus, the open architecture processing area allows for the storage of, inter alia, interactive multi media gaming functions.

In one scenario, at least one gaming device is actuated by inserting a coin in the coin acceptor or a bill in the bill validator. Gaming activity is then initiated by the player and a gaming outcome is influenced by the random number generator. The gaming outcome is then transmitted to the open architecture processing area to be animated on the visual display operatively coupled to the open architecture processing area. If the gaming outcome is a winning outcome the secure processor communicates with or drives the hopper so that a player winning on the gaming device can receive money back from a dispensing tray. Alternatively, the secure processing area may be provided with means to bestow credits as a function of the random gaming outcome.

The critical gaming functions of the present invention are stored in and executed directly from a media which is not alterable through any use of circuitry or programming of the gaming device itself and are verifiable as to content independent of any function of the gaming device. Critical gaming functions include a unique control of, or any interruption of signals from a component involved in a monetary transaction, including, coin acceptors, bill validators, hoppers, interfaces to cashless wagering systems, associated equipment used in the determination of a progressive or bonus award value or any device which provides for the input or collection of credits, wagers or awards. In addition, critical gaming functions also include all accounting functions including the direct and unique control of electromechanical and electronically stored meters, and the result of the random number generator utilized in determining game outcome. Furthermore, critical gaming functions include a unique control over a storage and retrieval of a historical log documenting credits, wagers, award transactions, random values used in determining game outcome and any security or error events for the most recent game player or games in progress and a plurality of games prior to the current or most recent game. This log is to be maintained in tact for a predetermined minimum period of time and after a power loss to the gaming device.

Furthermore, critical gaming functions may be partitioned from other functions by executing critical gaming functions on a separate dedicated processor and partitioning the devices hardware so that the functions not deemed critical which are stored or executed from alterable media are not capable of directly modifying the random access memory used by the critical gaming functions. Any component required to be uniquely controlled by the critical gaming functions are preferably not accessible by other functions stored or executed from alterable media. Thus, the non-alterable media containing the critical gaming functions is easily verifiable as to content independent of any function of the gaming device itself.

OBJECTS OF THE INVENTION

Accordingly, it is an object of the present invention to provide a new and novel gaming device security system: apparatus and method.

A further object of the present invention is to provide a gaming device security system as characterized above which includes two processing areas wherein a second processing area is sequestered for securing critical gaming functions and a first processing area is of an open architecture design expandable without any interference or access to the critical gaming functions stored within the second processing area.

Another further object of the present invention is to provide a system as characterized above which provides a security link operatively coupled between the first processing area and the second processing area for transmitting encrypted data correlative to critical gaming functions between the second processing area and the first processing area.

Another further object of the present invention is to provide a gaming device security system as characterized above which includes an accessible access means for coupling an external program validation device to an electronically programmable read only memory included in the second processing area.

Another further object of the present invention is to provide a gaming device security system as characterized above which includes an accessible access means for operatively coupling an external device validation process means to a static/battery backed random access memory included in the second processing area for validating suspicious jackpots and/or disputes.

Another further object of the present invention is to provide a gaming device security system as characterized above which precludes counterfeiting, tampering or modification of critical gaming functions including random outcomes and accounting logs of gaming results.

Another further object of the present invention is to provide a gaming device security system as characterized above which can be operatively coupled to an external source for downloading software into the gaming device.

Another further object of the present invention is to provide a gaming device security system as characterized above which includes a visual display for displaying decrypted random gaming outcome from the first processing area which has been transmitted thereto in an encrypted form by the second processing area via a security protocol.

Another further object of the present invention is to provide a gaming device security system as characterized above including a non-alterable memory means for storing critical gaming functions therein.

Another further object of the present invention is to provide a gaming device security system as characterized above which includes a security protocol for transmitting all critical gaming functions over a link coupling the first processing area with the second processing area.

Viewed from a first vantage point, it is an object of the present invention to provide a gaming machine comprising, in combination: a first processor having a visual display and a communication interface; a second processor sending communicating data with the first processor via the communicating interface, the second processor having means for sensing wagering activity and means for transmitting a random gaming outcome to the first processor to be animated on the visual display, the second processor provided with means to bestow credits as a function of the random gaming outcome.

Viewed from a second vantage point, it is an object of the present invention to provide a method for providing gaming security, the steps including: sequestering gaming functions into two processing areas, and linking the two processing areas via a security protocol.

Viewed from a third vantage point, it is an object of the present invention to provide a gaming device security system operatively coupled to at least one gaming machine, the system comprising in combination: a first processing means operatively coupled to and driving a visual display; a second processing means operatively coupled to the first processing means and communicating therewith via a secure protocol; a plurality of inputs enabled by a player allowing the player to initiate and sustain game play on at least the one gaming machine; the second processing means including means for determining random outcomes of game play and means for transmitting the outcomes to the first processing means for updating the visual display; a player memory card including memory storage means on the card removable from and accessible by to the second processing means to upload and download information between the second processing means and the player memory card reflective of status of an ongoing game.

Viewed from a fourth vantage point, it is an object of the present invention to provide a gaming device security system, comprising in combination: a first processor; a second processor including a non-alterable memory means for storing critical gaming functions therein; a communication link operatively coupled to the first processor and the second processor for transmitting encrypted data packets correlative of the critical gaming functions and outcomes.

These and other objects will be made manifest when considering the following detailed specification when taken in conjunction with the appended drawing figures.

DESCRIPTION OF PREFERRED EMBODIMENTS

Figure 1:
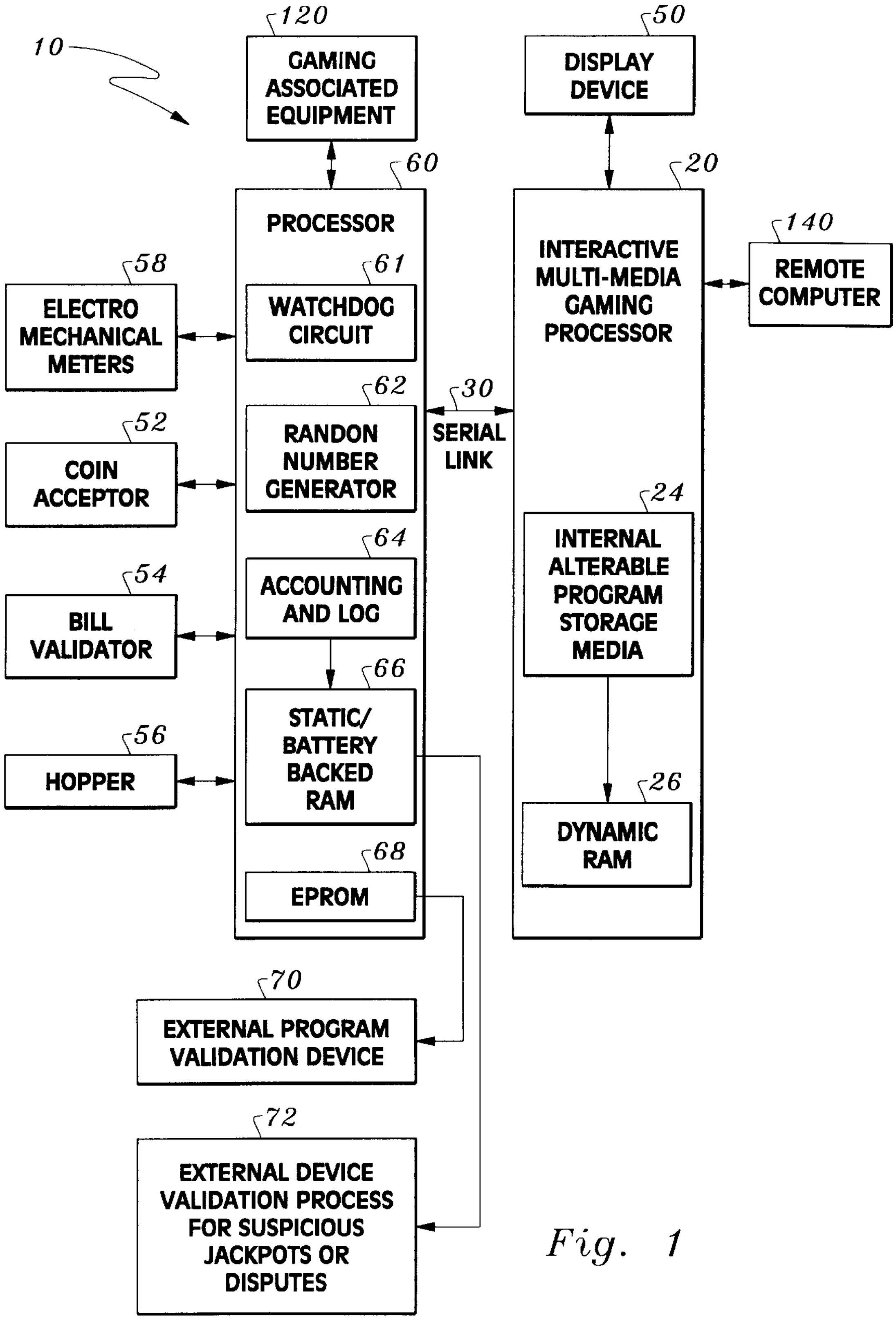
FIG. 1 is a schematic depiction of the present invention according to one form.

Considering the drawings, wherein like reference numerals denote like parts throughout the various drawing figures, reference numeral 10 is directed to the gaming device security system according to the present invention.

Figure 2:
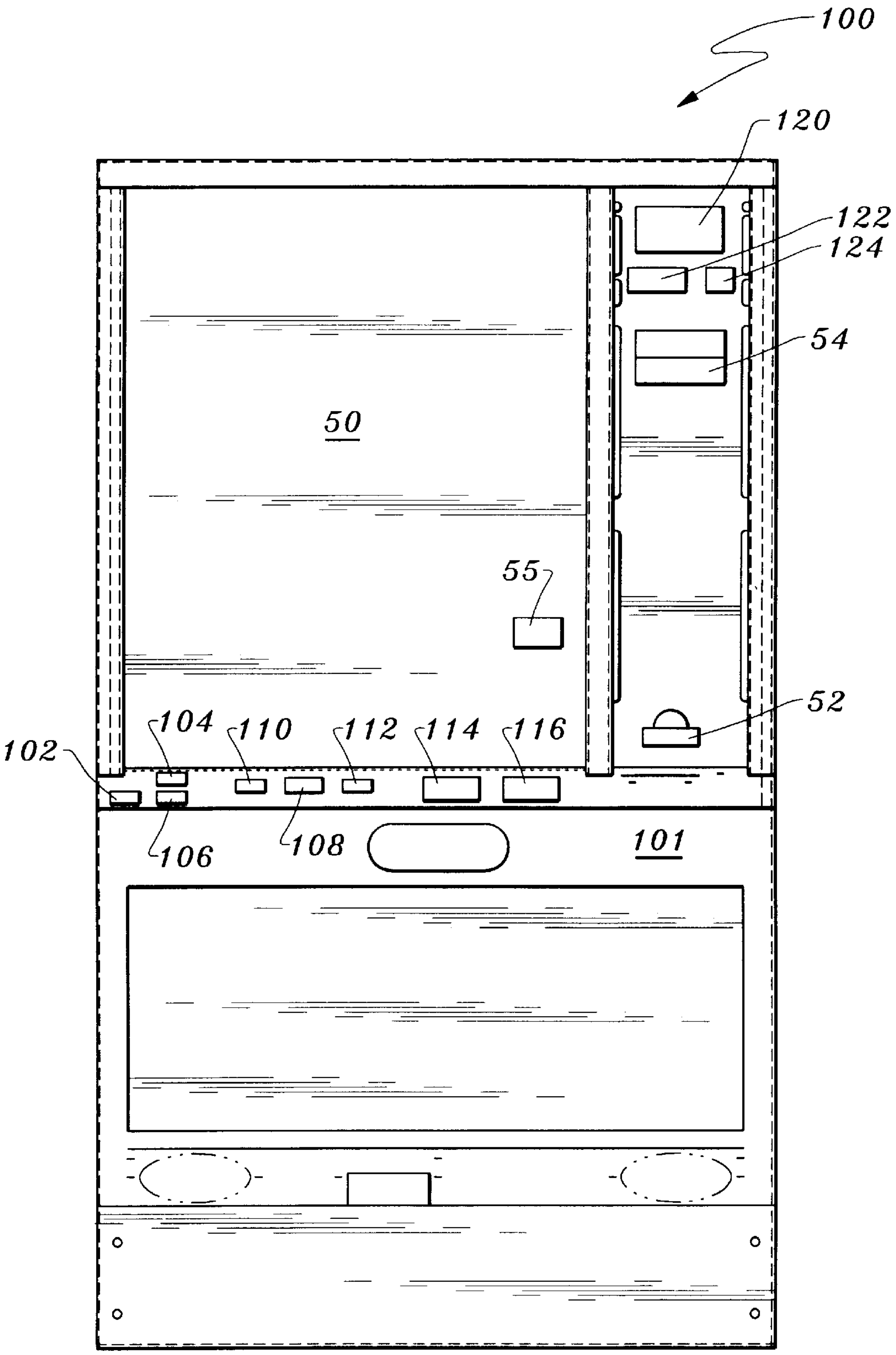
FIG. 2 is a plan front view of a gaming machine.

In its essence, and referring to FIGS. 1 and 2, the gaming device security system 10 is preferably housed within a gaming device 100 which may take the form of, for example, a video and/or a mechanical reel type slot machine. The gaming device security system 10 includes a first processing area 20 and a second processing area 60 operatively coupled to one another via a communication link 30. The communication link 30 provides the means for transmitting encrypted data, correlative to critical gaming functions, between the second processing area 60 and the first processing area 20. The first processing area 20 is operatively coupled to a visual display 50 for displaying, inter alia, gaming graphics and random gaming outcomes. The second processing area 60 of the system 10 includes means for sensing wagering activity and means for transmitting the random gaming outcomes to the first processing area 20 such that the outcome is animated on the visual display 50. In addition, the second processing area 60 includes means to bestow credits and/or monitory awards as a function of the random gaming outcome. Furthermore, the second processing area 60 can be directly accessed for validating the outcome of any game and the outcome can be displayed on the visual display 50, on an LCD display 55 or presented visually or audibly or any other peripheral.

More specifically, and referring to FIGS. 1 and 2, the gaming device security system 10 is operatively coupled to at least one video and/or slot gaming device 100. FIG. 2 shows an example of a video slot device 100 supporting the visual display 50 and including the coin acceptor 52, the bill validator 54, a cash out button 102, a service button 104, a bet one button 106, a display of features button 108 having scroll buttons 110, 112 disposed on either side, a spin reel button 114 and a play max button 116. In addition, the video slot device 100 includes a card reader 122, a card reader display 120 and a manual eject button 124.

The gaming device 100 is founded on the first and second processing areas 20, 60 linked together via a secure protocol. The first processing area 20 is of an open architecture design which includes an internal alterable program storage media 24 operatively coupled to a dynamic RAM means 26. Thus, the open architecture design of the first processing area 20 allows for the storage of, inter alia, interactive multi-media gaming functions. In addition, the first processing area 20 may be operatively coupled to an external source, for example, a remote computer 140 for downloading software into the gaming device 100 with out having access to or interfering with critical gaming functions stored in the second processing area 60. In addition, the first processing area 20 is operatively coupled to a visual display 50 for providing visual feedback to a gaming player.

The second processing area 60 is a secure processing area which includes, a watchdog circuit 61, a random number generator 62, an accounting and log means 64 operatively coupled to a static or non-volatile random access memory 66 and an electronically programmable read only memory 68 having stored therein the critical gaming functions. The second processing area 60 is operatively coupled to the visual display 50, a coin acceptor 52, a bill validator 54, a hopper 56 and electro-mechanical meters 58 which are preferably supported by the gaming device 100. In addition, the second processing area is coupled to associated gaming equipment 120 used in the determination of a progressive or bonus award value. The second processing area 60 is linked to the first processing area 20 with a communication link 30 which provides the link for transmitting data via the security protocol thereby precluding any alteration of the critical gaming functions.

The critical gaming functions are stored in and executed directly from the read only memory 68 which is not alterable through any use of circuitry or programming of the gaming device 100 itself and are verifiable as to content independent of any function of the gaming device 100.

Critical gaming functions preferably include a unique control of, or any interruption of signals from a component involved in a monetary transaction, including, coin acceptors, bill validators, hoppers, interfaces to cashless wagering systems, associated equipment used in the determination of a progressive or bonus award value or any device which provides for the input or collection of credits, wagers or awards. In addition, critical gaming functions also include all accounting functions including the direct and unique control of electromechanical and electronically stored meters, and the result of the random number generator utilized in determining game outcome. Furthermore, critical gaming functions include a unique control over a storage and retrieval of a historical log documenting credits, wagers, award transactions, random values used in determining game outcome and any security or error events for the most recent game player or games in progress and a plurality of games prior to the current or most recent game. This log is to be maintained in tact for a predetermined minimum period of time and after a power loss to the gaming device.

Furthermore, critical gaming functions are partitioned from other functions by executing critical gaming functions on the second processing area 60. Functions not deemed critical may be stored or executed from the alterable media 24 which is not capable of directly modifying the random access memory 66 or the electronically programmable read only memory 68 used by the critical gaming functions. Any component required to be uniquely controlled by the critical gaming functions are preferably not accessible by other functions stored or executed from the alterable media 24. Thus, the non-alterable media containing the critical gaming functions is easily verifiable as to content independent of any function of the gaming device 100 itself.

In general, the gaming device 100 is actuated by, for example, inserting a coin in the coin acceptor 52 or a bill in the bill validator 54. Gaming activity is then initiated by the player and a gaming outcome is influenced by the random number generator 62. The gaming outcome is then transmitted, via the secure protocol, to the open architecture processing area 20 and animated on the visual display 50. If the gaming outcome is a winning outcome the second processing area 60 communicates with or drives the hopper 56 so that a player winning on the gaming device 100 can receive money back from a dispensing tray 48. Alternatively, the secure processing area may be provided with means to bestow credits as a function of the random gaming outcome. The credits are preferably displayed to the player via the display 50.

Figure 3:
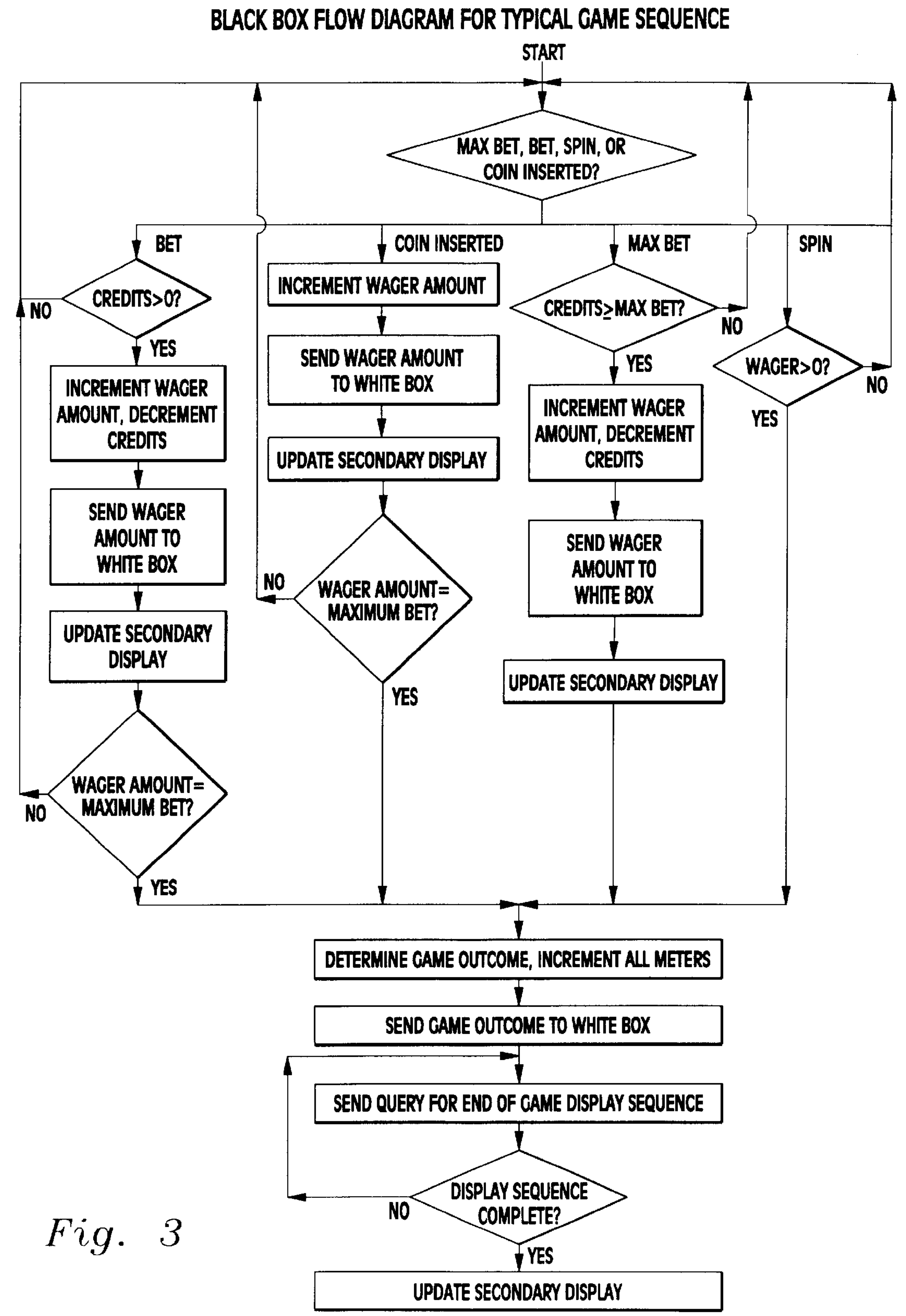
FIG. 3 is a flow chart of a method according to one form of the present invention of a typical game sequence of the second processing area.

More specifically, and referring to FIG. 3, the first processing area 20 may be referred to as a white box while the second processing area 60 may be referred to as a black box. With this terminology in mind one method of a typical game sequence with respect to the black box can be explored. Initially, a player places funds into the gaming device 100 via the coin acceptor 52, bill validator 54 or by inserting a card into a card reader 122. The player further interacts with the gaming device 100 by placing a bet by actuating the bet one button 106, placing a max bet by actuating the play max button 116, actuating game play via, for example pushing the spin reel button 114, or inserting further funds into the gaming device 100.

If a bet is placed, the second processing area 60 determines if the number of credits is greater than zero and if so increments the wager amount and decrements the credits which the player holds. The amount of the wager is then transmitted to the first processing area 20 or white box in an encrypted format such that the white box can update the visual display means 50. Once this transmission has been completed the second processing area or black box determines whether the wager amount is equal to a predetermined max bet amount. If the wager amount is equal to the max bet amount the black box determines the game outcome and increments all meters associated therewith. This game outcome is then transmitted in an encrypted form via the communication link 30 to the first processing areas 20 or between the black and white box. Once the outcome has been transmitted to the white box a query for an end of game display sequence is sent to the white box and this transmission continues until the display sequence is complete. Once the display sequence is complete the visual display is updated accordingly, the game sequence loops back to a subsequent start of game.

Alternatively, if a max bet means is initially actuated, the second processing area 60 determines if the number of credits the player has is greater than or equal to the predetermined amount of the max bet. If the player does not have enough credits to cover the max bet the black box remains at the start of the game sequence. If the player has enough credits to cover the max bet the wager amount is incremented while the player's credit amount is decremented. The amount of the wager is then transmitted to the first processing area 20 or white box in an encrypted format via the communication link 30. The first processing area 20 then updates the visual display 50 accordingly. The game outcome is then determined and all meters associated with the gaming device 100 are incremented if necessary. This game outcome is then transmitted in an encrypted form via the communication link 30 to the first processing area 20 or between the black and white box and the white box then updates the visual display means 50. Once the game outcome has been determined and displayed a query for an end of game display sequence is looped into action and displayed on the visual display 50 until the display sequence is complete. Once the display sequence is complete the visual display is updated accordingly and the game sequence loops back to a subsequent start of game.

At the start of any game sequence the player has the option of actuating game play by, for example, pushing a spin or draw button which will result in the black box determining the outcome of the game if the player has placed a wager amount which is greater than zero. If the player has not placed a wager the black box will remain in the start of the game sequence. However, if the player has placed a wager the outcome of the game is determined and then transmitted to the white box in an encrypted form via the communication link 30. Once again a query for end of game display sequence is looped into action and displayed on the display 50 until the sequence is completed and then subsequently the visual display 50 is updated and a new start of game sequence is initiated.

Initially inserting funds into the gaming device 100 causes the wager amount to be incremented and transmitted to the white box in an encrypted form such that the white box will update the visual display 50. Inserting further funds into the gaming device 100 without actuating a bet, max bet or game play option will cause this process to continue until the insertion of funds has equaled the max bet amount. When this occurs the game is actuated and the outcome is determined. This outcome increments all associated gaming meters and is sent to the white box in an encrypted form which in turn initiates the query for the end of game display sequence to be initiated on the visual display 50. This continues until the display sequence is complete. Once the display sequence is completed the visual display is updated and the start of game sequence is initiated.

Figure 4:
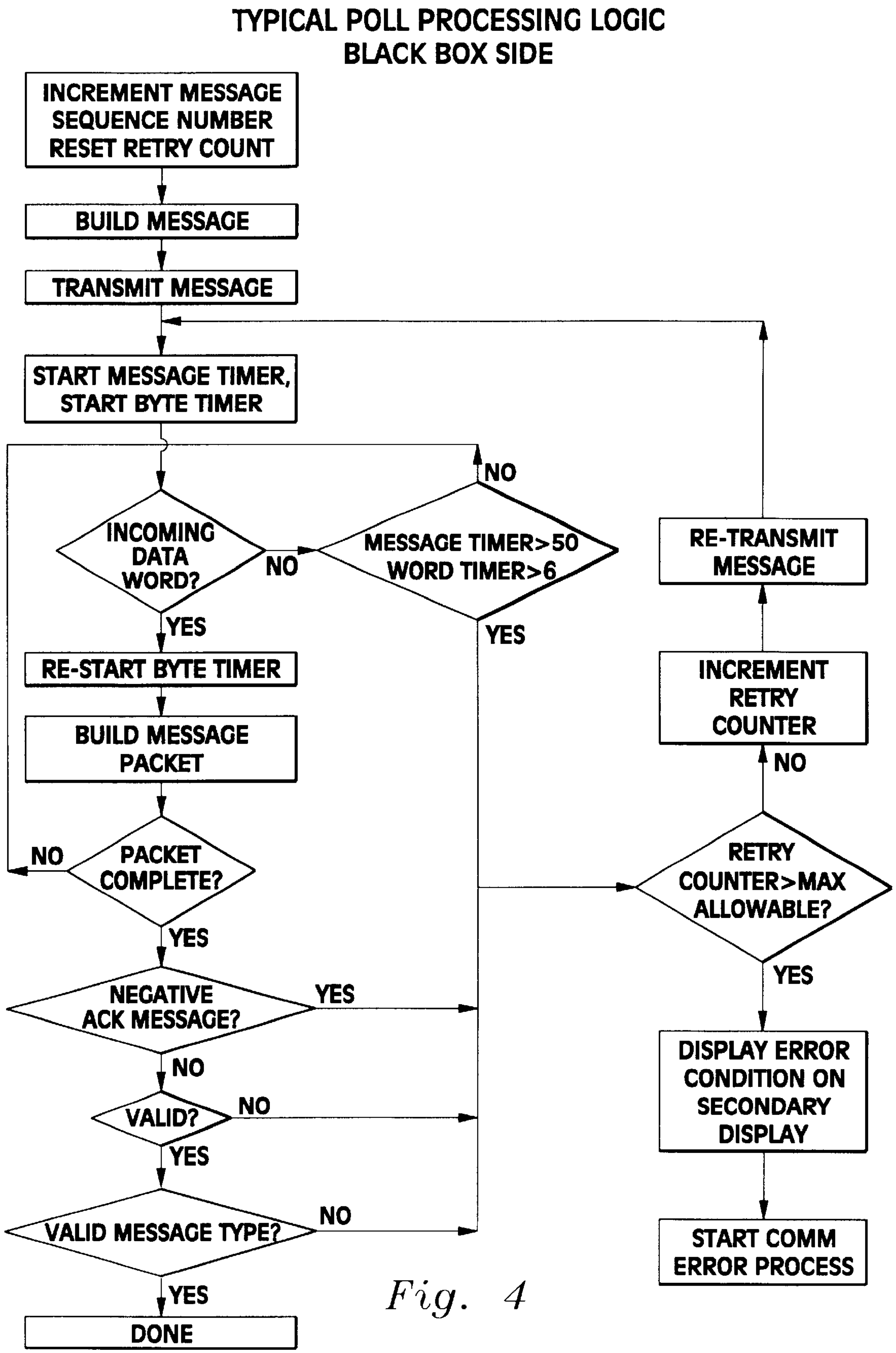
FIG. 4 is a flow chart of a typical poll processing logic method of the first processing area according to one form of the present invention.
Figure 5:
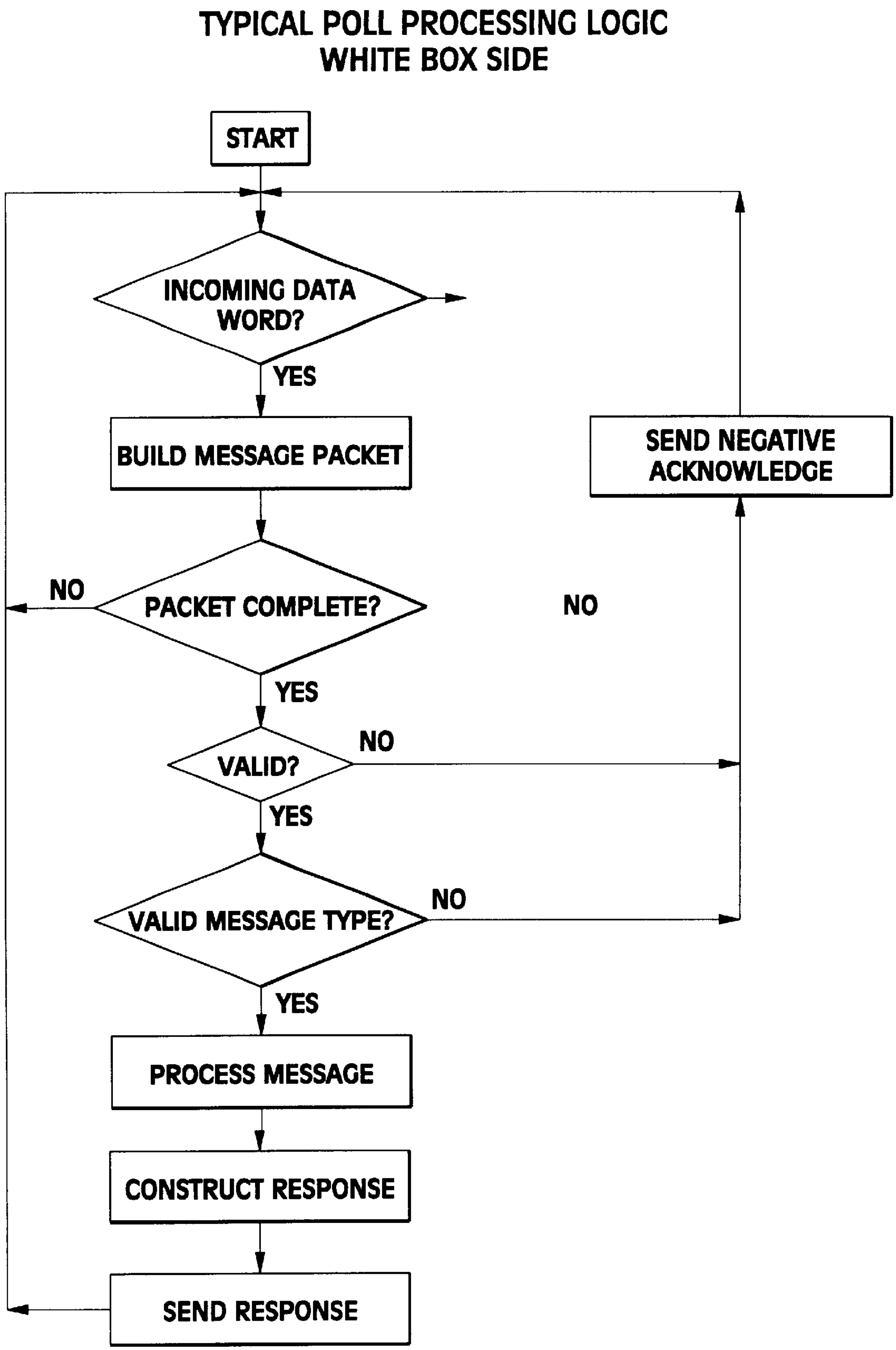
FIG. 5 is a flow chart of typical poll processing logic method of the second processing area according to one form of the present invention.

FIGS. 4 and 5 detail a poll processing logic method between the black box side and the white box side, the two processing areas 20, 60, of the system 10.

Referring to FIG. 4, when a message is be sent from the black box to the white box the black box increments a message sequence number and resets a retry counter included in the second processing area 60. Next, the black box 60 builds an encrypted message and transmits this message via the communication link 30. In addition, the black box starts a message timer and a byte timer included in the second processing area 60.

Meanwhile, and referring to FIG. 5, the white box 20 tests for incoming data words. When an incoming data word is found the white box decrypts the transmitted message and builds a message packet. The white box continues to receive the incoming data word and decrypts and builds the message packet until the message packet is complete. Once the message packet is complete the white box determines if the decrypted message packet is valid and if so then discerns whether the message itself is of a valid type. Once the white box has validated the message packet and determined that the message is a valid one it processes the message and constructs a response. The response is encrypted and sent back to the black box side. Alternatively, if the white box determines that the packet is invalid or that the message type of the packet is invalid it sends a negative acknowledgment to the black box side.

Referring back to FIG. 4, The black box determines if the white box is sending a response in the form of an incoming data word. If the black box discerns that the white box is sending a data word the black box receives the data word and restarts the byte timer. The black box then decrypts the data word and starts to build a message packet. The black box will check this message packet and if the message packet is incomplete it will continue to receive the incoming data word from the white box and will restart the byte timer after each check of the message packet. This continues until the message packet is complete. Once the message packet is complete the black box discerns whether a negative acknowledge message has been sent by the white box and if a negative acknowledge message has not been sent by the white box the black box discerns whether the packet is a valid packet and also discerns whether the packet contains a valid message type. If both criteria are met the transmission of the response is complete.

Alternatively, if the message packet built by the black box is not a valid packet or if the message type within the packet is not valid, the black box will increment the retry counter and re transmit the original message to the white box. As long as each incoming message packet built by the black box is not a valid packet or if the message type within the packet is not valid message the black box will increment the retry counter and re transmit the original message to the white box until the retry counter has a value which is greater than a maximum allowable value. Once the maximum allowable value of the retry has been obtained an error message will be displayed on the visual display and once again a communication error process will be initiated.

Alternatively, if the incoming data word from the white box to the black is a negative acknowledge message the black box will continue to increment the retry counter and re transmit the message until the retry counter is greater than a maximum allowable value. Once the retry counter reaches a value which is greater than maximum allowable value an error condition is displayed on the visual display and system 10 initiates a communication error process to discern why the negative acknowledge message is being sent.

If the response from the white box is not an incoming data word and a message timer and a byte timer is less than predetermined values the black box will continue to poll for an incoming word. If the black box is receiving a response from a white box which is not an incoming data word and the message timer and the byte timer are greater than predetermined values the black box will increment the retry counter and re transmit the message to the white box. The black box will continue this process until the retry counter is greater than a maximum allowable value. Once the retry counter reaches a value which is greater than maximum allowable value an error condition is displayed on the visual display and system 10 initiates a communication error process to discern the cause of the error.

In the preferred embodiment, the second processing area is the master communication device and initiates all messages. The first processing area is the slave and transmits data only when polled by the master. All message data shall be encrypted to provide data security. Preferably, each incoming data word includes a unique identification signature which includes at least one leading bit and at least one trailing bit attached to the ends of the data word. By checking the leading and trailing bits of each data word the system can discern the validity of the identification signature of each data word. Alternatively, each completed packet can include a unique identification signature which includes at least one leading bit and at least one trailing bit attached to the ends of the message. By checking the leading and trailing bits of each message the system can discern the validity of the identification signature of each message.

The gaming device 100 includes an input/output device 122 for reception of a player memory card 280 that the device 100 can read and write to. The device may also include a separate stand alone station where the player can take the player memory card for a status diagnostic including the relative ranking of the player during the course of play or at the end of the set period for play including an opportunity to redeem awards associated with player performance.

More particularly, and with reference to FIGS. 1 and 2, the gaming device 100 is shown according to one form of the invention. The gaming device 100 includes a housing 101 that supports therewithin, a display 50 to an area for receiving a wager 52, 54 a place 122 to receive a player memory card, a display 120 that allows supplemental information to be received thereon, a plurality of decision making buttons 102 through 116 and optionally a handle which can be used in lieu of one of the decision making buttons in order to initiate play of the game. In addition, a payout hopper 56 can be included for a redeeming awards based on play in using the gaming device 100.

Figure 8:
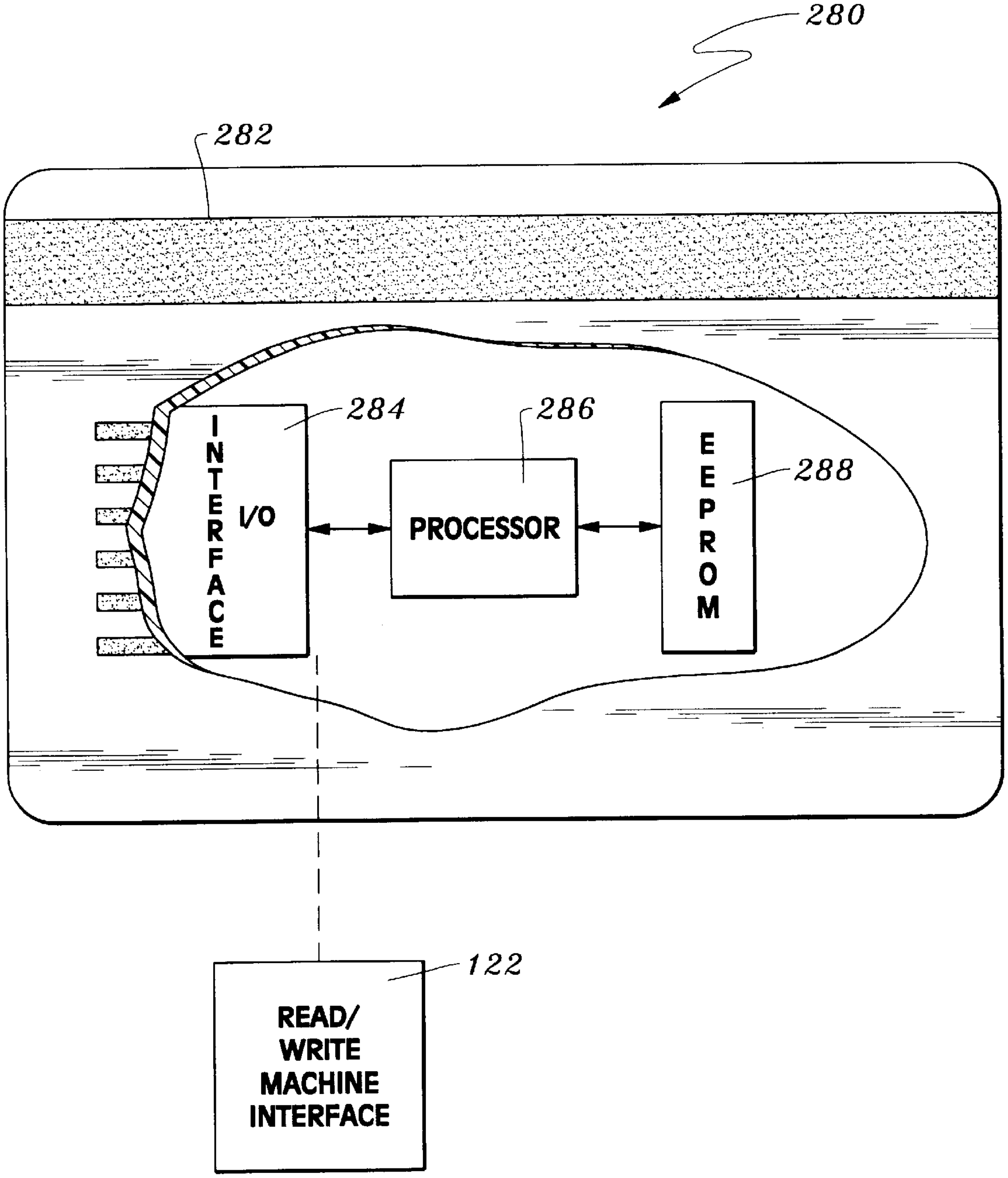
FIG. 8 is a drawing reflecting the interaction between a player memory card and a source of uploading and downloading.

FIG. 8 reflects details of the player memory card 280 and its relationship to a read/write machine interface 122 that receives the player memory card 280. More particularly, the player memory card 280 can be configured as a substantially plan rectangular piece of plastic which can include encoding on a magnetic strip includes an input/output interface 284 that can be read by the read/write machine interface 122 shown in FIG. 8. In essence, the input/output interface 284 is operatively coupled to an integrally formed processor or storage unit 286 contained in the player memory card 20 and the processor or storage unit 286 interfaces with an electrically erasable programmable read only memory 288 or other black box circuitry so that the ongoing status of the player's gaming activities can be uploaded and downloaded to and from the machine 100. In addition, automatic downloading of the player's descriptive information (name, address, social security number, etc.) is preferably accomplished when the memory card is in the read/write machine interface 122. This information is used for, inter alia, marketing use by the casino. The magnetic strip 282 can include other information if desired, such as player identification or a form of encryption for detecting the validity of the player memory card 280. In addition, the processor 286 and its memory 288 can be included with encryption or decoding means so that appropriate "handshaking" can occur between the machine interface 121 and the card 280 to minimize the likelihood of cards which have been updated by an improper unauthorized technique.

Figure 6:
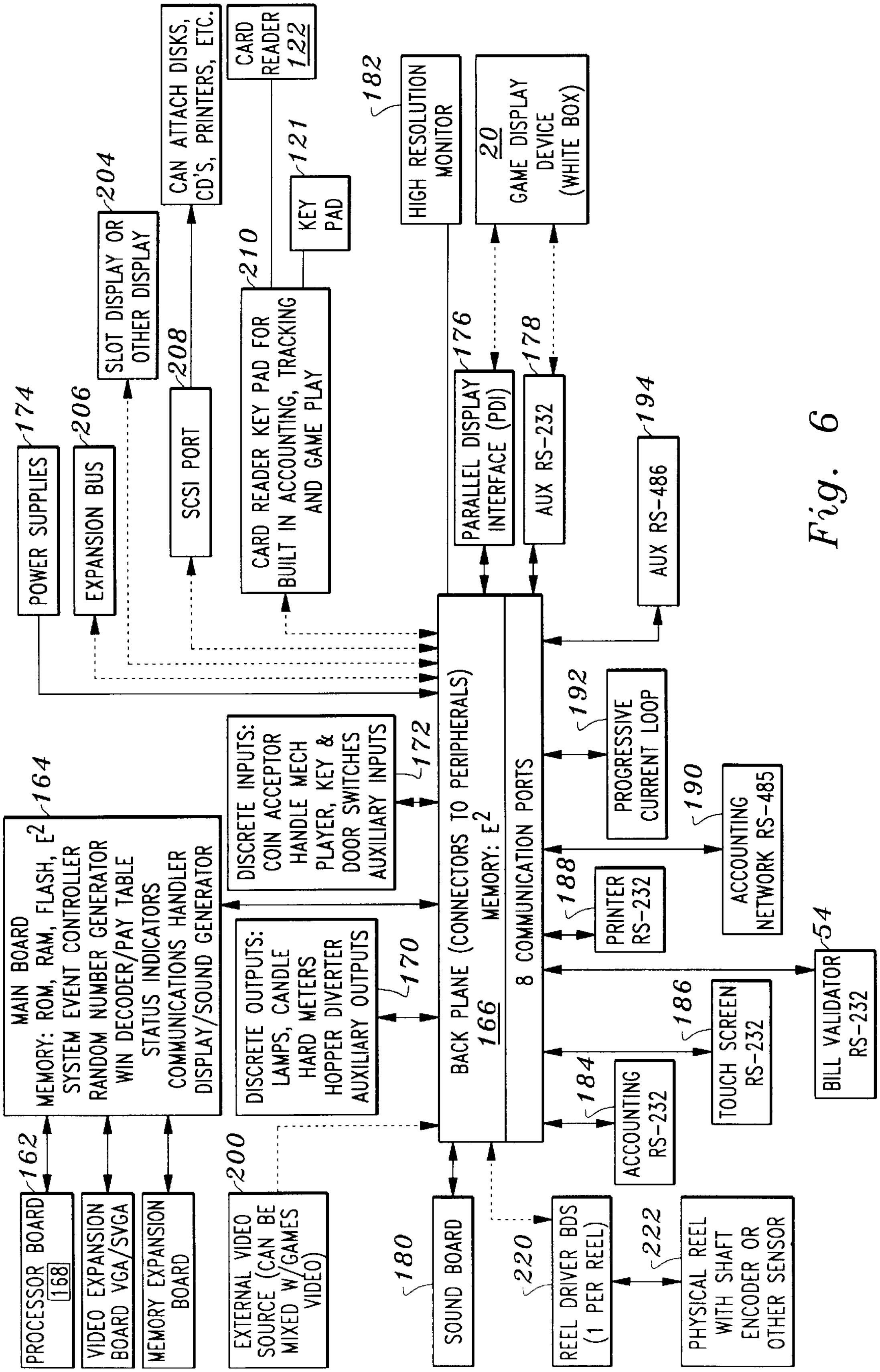
FIG. 6 is a detailed block diagram of the second processing area according to one form of the present.

In use and operation, and referring to FIG. 6, the secure processing area 60 includes a processor board 162, a main board 164 and a back plane 166 integrally or separately formed. The processor board 162 includes a graphics system processor 168 which is operatively coupled to the main board 164. The main board 164 preferably includes memory in the form of ROM, RAM, flash memory and EEPPROM (electrically erasable programmable read only memory). The ROM includes the EPROM 68. In addition, the main board 164 includes a system event controller, the random number generator 62, a win decoder/pay table, status indicators, a communications handler and a display/sound generator.

The main board 164 is operatively coupled to the back plane 166 which includes memory preferably in the form of an EEPROM and connectors to connect to peripherals. Furthermore, the back plane 166 provides a plurality of communication ports for communicating with external peripherals. The back plane 166 provides the coupling between discrete inputs 170 and the processor 168 and main board 164. Typical examples of elements which provide discrete inputs are coin acceptors, game buttons, mechanical hand levers, key and door switches and other auxiliary inputs. Furthermore, the back plane 166 provides the coupling between discrete outputs 172 and the processor and main board 164. Typically, elements which provide discreet outputs are in the form of lamps, hard meters, hoppers, diverters and other auxiliary outputs.

The back plane 166 also provides connectors for at least one power supply 174 for supplying power for the second processing area 60 and a parallel display interface "PDI" 176 and a serial interface for linking with the first processing area 20. The communication link 30 between the black box and the white box is via the parallel display interface 176 and/or the serial interface 178. In addition, the back plane 166 also provides connectors for a sound board 180 and a high resolution monitor 182. Furthermore, the back plane 166 includes communication ports for operatively coupling and communicating with an accounting means 184, a touch screen 186, the bill validator 54, a printer 188, an accounting network 190, a progressive current loop 192 and an auxiliary serial link 194.

The back plane 166 optionally includes connectors for external video sources 200, expansion busses 202, slot or other display means 204, a SCSI port 208 and the card reader 122 and key pad 123. The back plane 166 also preferable includes means for coupling a plurality of reel driver boards 220 which drive physical slot reels 222 with a shaft encoder or other sensor means to the processor 168 and main board 164.

Figure 7:
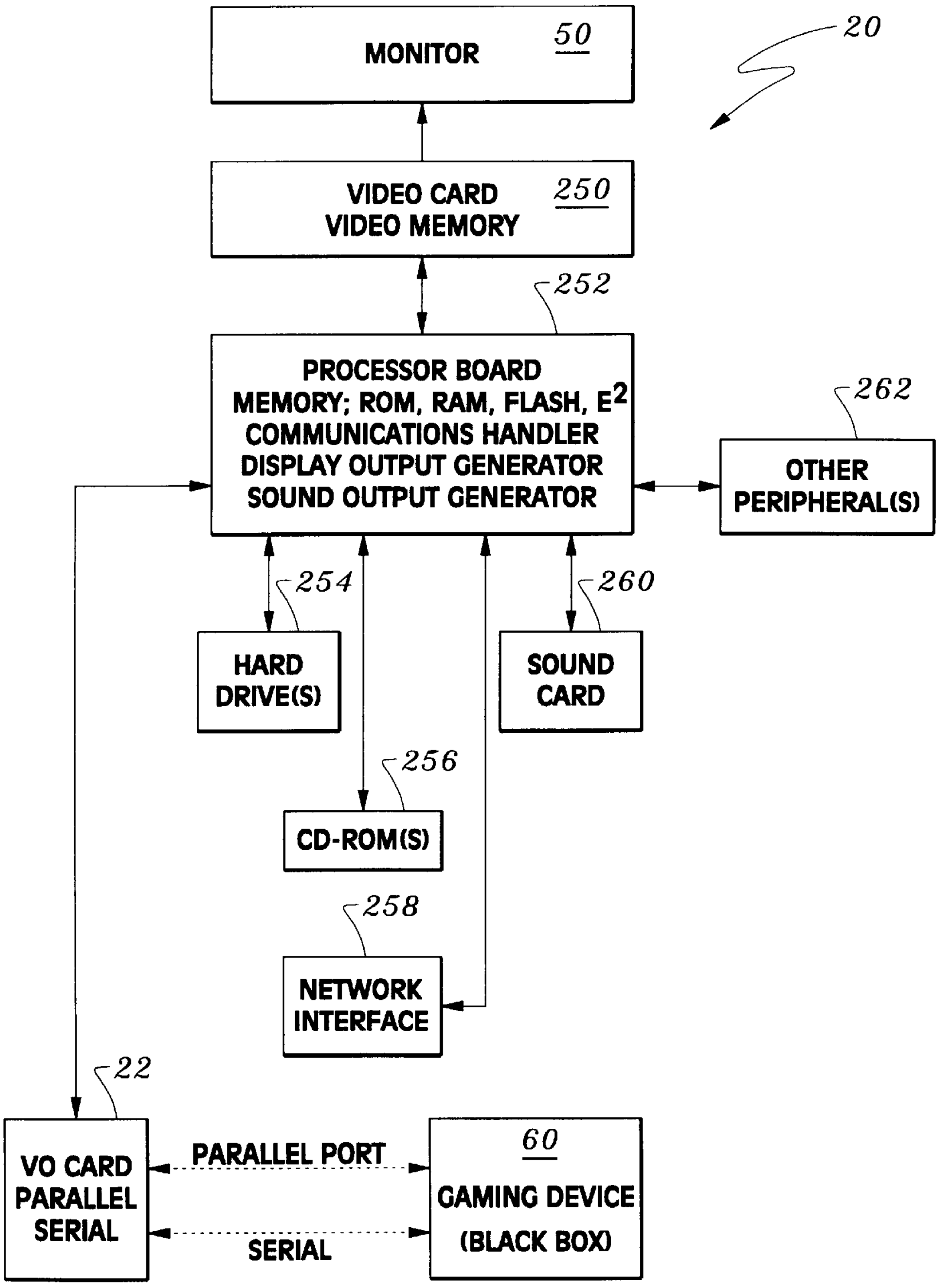
FIG. 7 is a detailed block diagram of a first processing area according to one form of the present.

Referring to FIG. 7, the white box can be an interactive multi-media gaming computer which includes the first processing area 20. The first processing area 20 includes an input/output parallel and serial card 22. The input/output card 22 is operatively coupled to a first processing area processor board 252. The processor board 252 preferably includes memory in the form of read only memory, the dynamic random access memory 26 and internal alterable program storage media 24, for example, flash memory and electrically erasable programmable read only memory. In addition, the processor board 252 includes a communications handler, a display output generator and a sound output generator. The processor board 162 is operatively coupled to a video card 250 with video memory which in turn is operatively coupled to the visual display means 50.

The processor board also allows peripherals in the form of, for example, hard drives 254, CD ROMS 256, network interfaces 258, sound cards 260 and other desirable peripherals 262 for game enhancement and patron entertainment.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A gaming machine, comprising, in combination:

a first processor having open architecture to allow reception of game formats, a visual display and a communication interface;

a second processor sending encrypted communicating data with said first processor via said communicating interface, said second processor having closed architecture which precludes access to critical gaming functions and programs;

said second processor having means for sensing wagering activity and means for transmitting a random gaming outcome to said first processor to be animated on said visual display;

said second processor provided with means to bestow credits as a function of the random gaming outcome.

2. The gaming machine of claim 1 wherein said second processor includes a non-alterable memory means for said storing critical gaming functions therein.

3. The gaming machine of claim 2 wherein said second processor includes a random access memory for storing accounting and gaming outcome information therein.

4. The gaming machine of claim 2 wherein said non-alterable memory means includes an interface to couple with an external program validation device.

5. The gaming machine of claim 4 wherein said random access memory of said second processor includes means for interfacing with an external device validation process for directly validating the outcome of any game.

6. The gaming machine of claim 1 wherein said second processor includes a random number generator for determining the random gaming output.

7. The gaming machine of claim 1 wherein said first processor includes an alterable program storage media for storing interactive multi-media gaming functions downloaded from a remote source without interfering with critical gaming programs and functions stored in the second processing area.

8. A method for providing gaming security, the steps including:

sequestering gaming functions into two processing areas within one gaming machine, and linking the two processing areas via a security protocol, one said processing area having open architecture, the other said processing area having closed architecture.

9. The method of claim 8 including forming said two processing area into a first processing area and a second processing area, providing the first processing area with player stimulus, providing the second processing area with a response from the player as a function of player stimulus, and having the second processing area drive the first processing area as a result of player response.

10. A gaming device security system operatively coupled to at least one gaming machine, the system comprising, in combination:

a first processing means operatively coupled to and driving a visual display and having open architecture;

a second processing means having closed architecture operatively coupled to said first processing means and communicating therewith only via a secure protocol;

a plurality of inputs enabled by a player allowing the player to initiate and sustain game play on at least the one gaming machine;

said second processing means including means for determining random outcomes of game play and means for transmitting said outcomes to said first processing means for updating said visual display;

a player memory card including memory storage means on said card removable from and accessible by said second processing means to upload and download information between said second processing means and said player memory card reflective of status of an ongoing game, whereby a player can discontinue play by storing game information on said memory card and subsequently resume play in progress by refreshing said second processor means in said system.

11. A gaming device security system, comprising in combination:

a first processor having open architecture;

a second processor having closed architecture including a non-alterable memory means for storing critical gaming functions therein;

a communication link operatively coupled to said first processor and said second processor for transmitting encrypted data packets correlative of said critical gaming functions and outcomes.

12. The system of claim 11 wherein said encrypted data packets include an encrypted data message and a unique identification signature to be validated upon receipt.

13. The system of claim 12 wherein said unique identification signature includes at least one leading bit and at least one trailing bit attached to ends of said data message.

14. The system of claim 13 further including means for checking said leading and said trailing bits of each data packet for validity of the identification signature.

15. The system of claim 14 further including means for validating each data message of each data packet.

16. A gaming device for use by a player comprising:

a visual display accessible to a player;

a first processing area having an open architecture with respect to application programming and including a microprocessor and an alterable storage media capable of being externally alterable without affecting a key game function of determining a random game outcome, said first processing area coupled to and driving said visual display;

a second processing area having a closed architecture including a non-alterable media for performing said key gaming function of determining a random game outcome, said non-alterable media being secure so as to retain the ability for regulatory validation;

an electrical path connecting said first and second processing areas for communication of said random game outcome.

17. The gaming device of claim 16 wherein said first processing area includes display software for determining visual graphics on said visual display; and wherein said first processing area is externally alterable via downloading of display software from a source distinct from said second processor.

18. The gaming device of claim 16 wherein said second processing area includes a microprocessor.

19. The gaming device of claim 16 wherein said second processing area includes a non-volatile random access memory.

20. The gaming device of claim 19 wherein said non-volatile random access memory stores game outcome information.

21. The gaming device of claim 16 wherein said second processing area includes a random number generator for determining said random game outcome.

22. The gaming device of claim 16 further including an interface for connection with an external validation device.

23. The gaming device of claim 16 wherein said second processing area senses wagering activity.

24. The gaming device of claim 17 wherein said second processing area bestows credits as a function of said random game outcome.

25. The gaming device of claim 16 wherein said gaming device is configured as a slot machine.

26. The gaming device of claim 16 wherein said electrical path is a communication link.

27. The gaming device of claim 26 wherein said communication link is a serial communication link.

28. The gaming device of claim 16 wherein said gaming device is connectable to an external validation device; and wherein said non-alterable media is capable of validation by the external validation device.

* * * * *